(12) United States Patent
Kandasamy et al.

(10) Patent No.: US 7,908,476 B2
(45) Date of Patent: Mar. 15, 2011

(54) VIRTUALIZATION OF FILE SYSTEM ENCRYPTION

(75) Inventors: Madhusudanan Kandasamy, Tamilnadu (IN); George Mathew Koikara, Bangalore (IN); Pruthvi Panyam Nataraj, Karnataka (IN); Vidya Ranganathan, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 11/621,800

(22) Filed: Jan. 10, 2007

(65) Prior Publication Data

US 2008/0165957 A1    Jul. 10, 2008

(51) Int. Cl.
*H04L 29/06* (2006.01)
*G06F 9/00* (2006.01)
*G06F 12/00* (2006.01)

(52) U.S. Cl. ........ 713/164; 713/165; 713/167; 713/193; 713/194; 726/2; 726/15; 726/26; 707/821; 707/823; 707/828; 707/831

(58) Field of Classification Search .................. 713/165, 713/164
See application file for complete search history.

(56) References Cited

U.S. PATENT DOCUMENTS

| | | | |
|---|---|---|---|
| 6,711,572 B2* | 3/2004 | Zakharov et al. | 707/10 |
| 6,981,138 B2* | 12/2005 | Douceur et al. | 713/153 |
| 7,017,188 B1* | 3/2006 | Schmeidler et al. | 726/26 |
| 2005/0278527 A1* | 12/2005 | Liao et al. | 713/165 |
| 2006/0288040 A1* | 12/2006 | Boerger et al. | 707/104.1 |
| 2007/0168048 A1* | 7/2007 | Allen et al. | 700/2 |

OTHER PUBLICATIONS

Lim et al., "ICFS: Integrated Crypto-Filesystem Into Vnode Layer Using Access Control", Proceedings of the 6th IASTED International Conference Internet and Multimedia Systems and Application, 2002, pp. 97-101.
Webber, Operating System Support for Portable Filesystem Extensions, USENIX Association, Proceedings of the Winter 1993 USENIX Conference, pp. 219-228.

* cited by examiner

*Primary Examiner* — Taghi T Arani
*Assistant Examiner* — Mohammad L. Rahman
(74) *Attorney, Agent, or Firm* — Yee & Associates, P.C.; David A. Mims, Jr.

(57) ABSTRACT

A computer implemented method, apparatus, and computer program product for using a virtual file system to encrypt files. The process registers a plurality of file systems on a data processing system with the virtual file system. The virtual file system is enabled to encrypt files without intervention from any file system in the plurality of file systems. The virtual file system identifies whether a file on a given file system is an encrypted file using a map file associated with the given file system. In response to identifying the file as an encrypted file, the virtual file system encrypts all data written to the file in accordance with encryption specifications in the map file.

19 Claims, 6 Drawing Sheets

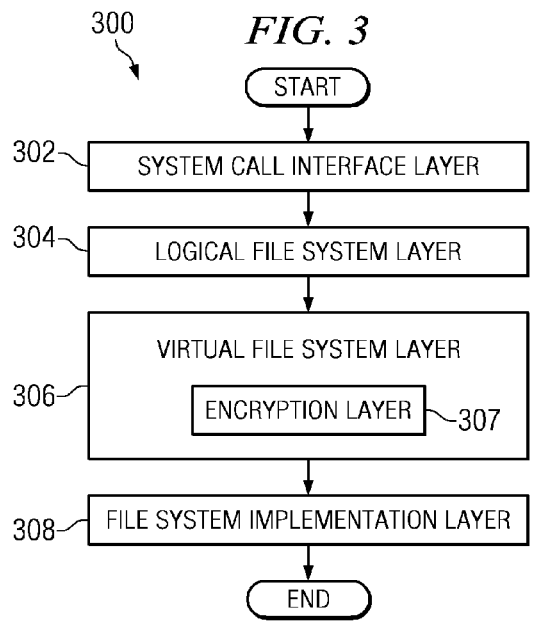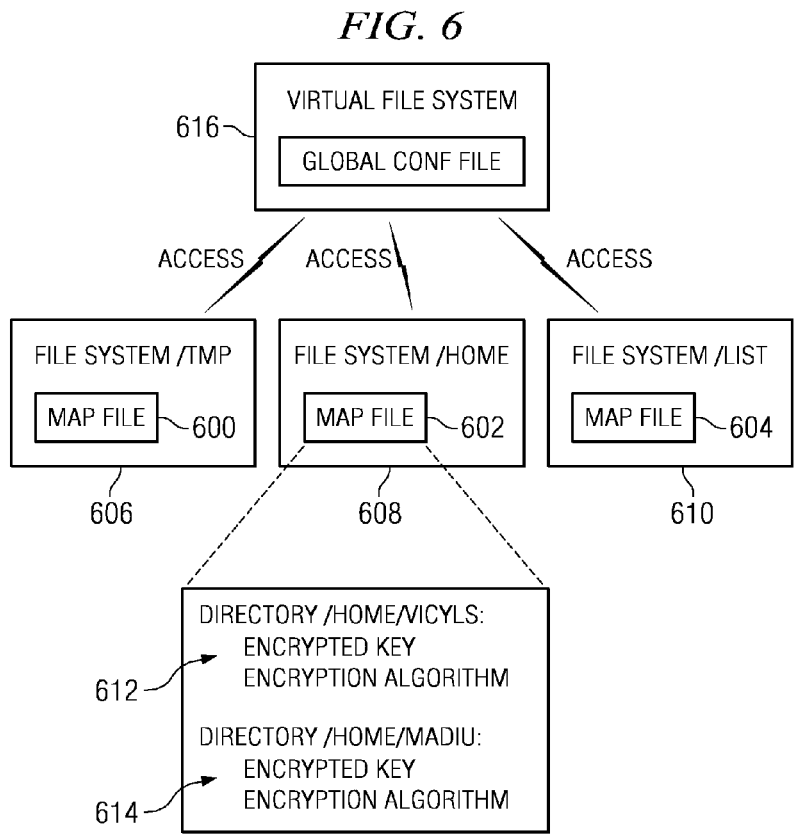

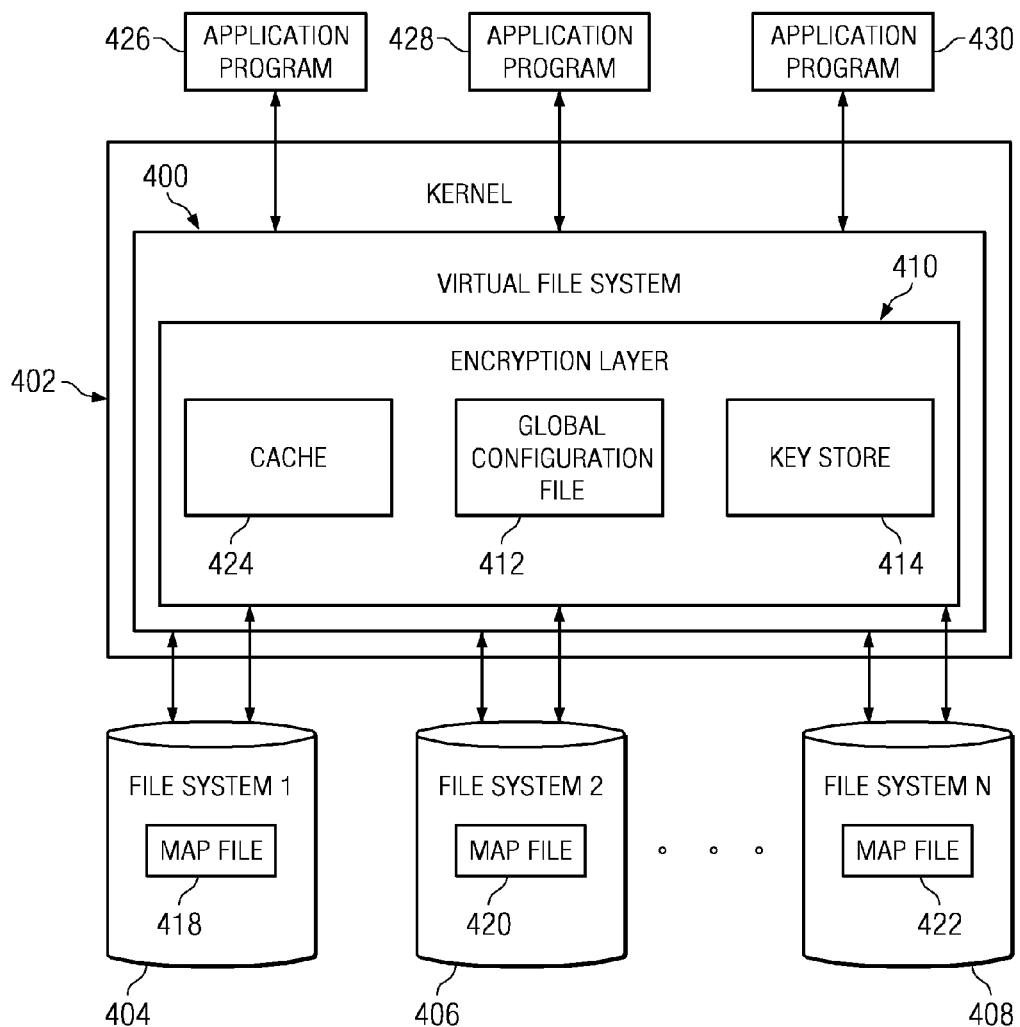

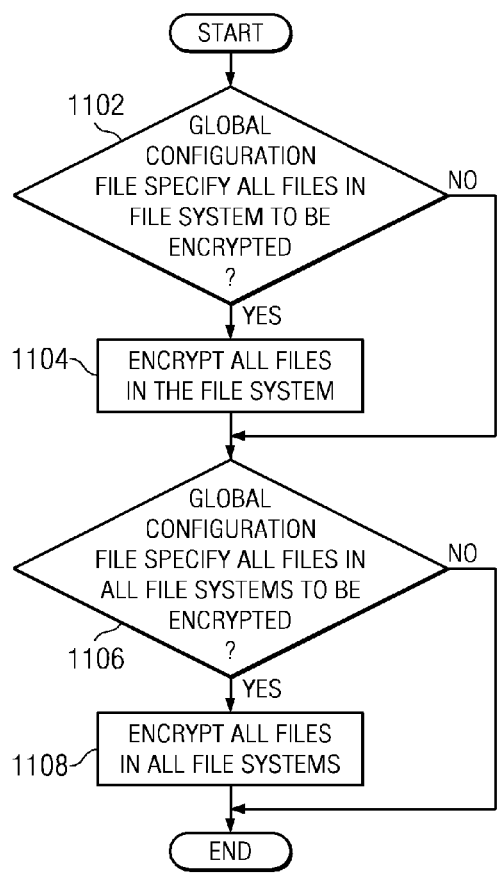
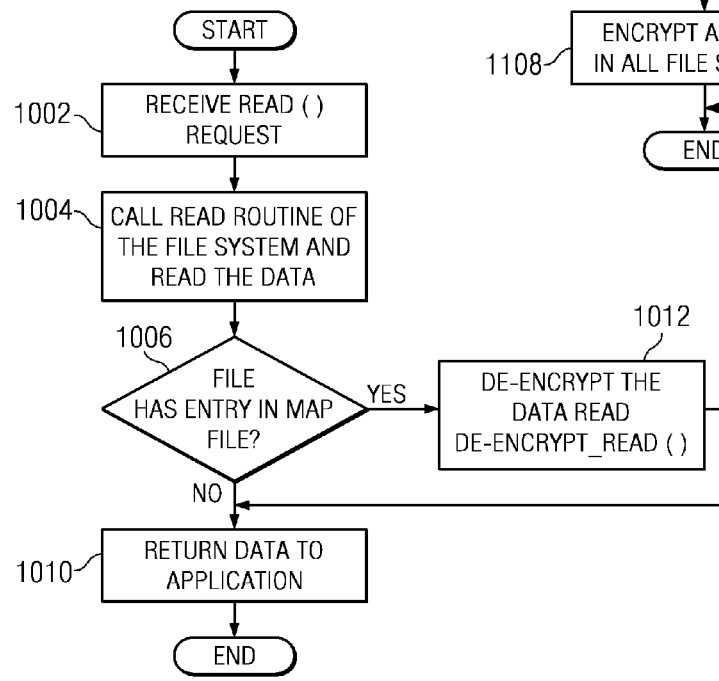

ved without the need to create new encrypted file systems.

VIRTUALIZATION OF FILE SYSTEM ENCRYPTION

BACKGROUND OF THE INVENTION

1. Field of the Invention

The present invention is related generally to a data processing system and in particular to a method and apparatus for encryption. More particularly, the present invention is directed to a computer implemented method, apparatus, and computer usable program code for introducing an encryption facility into a virtual file systems layer for encrypting files in heterogeneous file systems.

2. Description of the Related Art

A file is a resource for storing information and/or data in a computer. A file system is a method or data structure for organizing and managing computer files. A file system provides a better way for organizing files on the computer, physically and logically. There are many different types of file systems currently available, including but not limited to, Unix® file system (UFS), and Veritas® file system (VFS). A computer system that includes two or more different types of file systems is a heterogeneous file system.

Data stored in files on a file system are frequently of a sensitive nature such that it is desirable to prevent some users of the computer system from being able to access the data. For example, files in a bank computer system might include customer financial account information that needs to be protected from access by the general public and employees without a given security clearance level. File encryption reduces the risk of unauthorized access to sensitive data.

Encryption refers to encoding, enciphering, or obfuscating data such that the data is unintelligible to unauthorized users. Encryption and de-encryption is typically achieved by using a key or secret code. Encrypting data prevents the data from being read or interpreted by users who do not possess the correct secret key, thus disallowing malicious insecure data access. If the same key is used to encrypt and de-encrypt data, the encryption is referred to as symmetric encryption. If different keys are used to encrypt and de-encrypt data, the encryption is referred to as asymmetric encryption. Public key encryption and private key encryption are two traditional cryptographic methods available for securing data.

Encrypted file systems provide core file encryption technology used to store encrypted files on the file system. However, multiple disparate cryptographic file system models exist. In a heterogeneous file system, this can lead to multiple different encryption methods or models in use among the various file systems.

For example, volume encryptors use the device driver layer to encrypt and de-crypt information written to and read from a physical disk. Volume encryptors encrypt whole drives and are transparent to the end user. Volume encryptors include systems such as secure file system (SFS) and ScramDisk. However, volume encryptors do not provide fine-grained control to allow users to select to encrypt some individual directories and files and select to not encrypt other directories and files. In other words, volume encryptors do not provide granular encryption as the file level.

File encryptors operate at the application or presentation layer to provide end-to-end file encryption. In order to provide some sort of transparency to the user, file encryptors typically require some measure of application rewrite in order to support encryption. File encryptor systems include tools such as pretty good privacy (PGP). However, file encryptors are intended to operate on small numbers of files. File encryptors do not scale well to storage systems. In addition, file encryptors operate in the user memory space, whereas virtual file systems and the operating system kernel operate in the kernel memory space. Therefore, copy-in and copy-outs of data from the user memory space to the kernel memory space would be necessary when implementing file encryptors during write-in and read-out operations on files which would decrease processing efficiency.

File system encryptors allow the encryption of files on a per-file or a per-directory basis using a single key. One implementation of a cryptographic file system is through the use of a kernel resident file system. Using this encryption facility, a file system can be mounted on any directory, as well as on top of a different file system, such as UFS or NFS. This model removes the need for additional daemon processes that may be exploited to gain access to the file system or possibly to the files. This implementation model is used by CryptFS. In CryptFS, the interface is provided through a stackable virtual node (V-node). V-nodes can be used to represent an open file, directory, device, or other objects. V-nodes do not express what type of physical file system they implemented.

V-node stacking allows for file system modularization where one V-node interface calls another V-node interface. Each V-node operation in CryptFS calls its next-lower layer function for file system specific operations. CryptFS inserts itself on top of any directory, encrypts file data before it is passed the file system, and de-encrypts it in the reverse direction. However, file system encryptors like CryptFS do not permit files to be designated as non-encrypted files. In other words, file system encryptors encrypt all files in the file system.

True Crypt is an open source disk encryption software. True Crypt creates a virtual encrypted disk within a file and mounts it as a real disk. True Crypt can also encrypt an entire hard disk partition. However, True Crypt only allows creation of new encrypted file systems. True Crypt does not provide for fine granularity and selectively encrypting some files and directories but not encrypting other files and directories.

There are a few third party tools or applications available which act as kernel extensions that sit on top of the kernel, thereby gaining kernel authority and/or privileges to perform encryption operations. These kernel extensions behave like a driver with "crypto" features for encryption and decryption. However such kernel extensions are also built on V-node stacking techniques and have their own limitations as discussed above. These methods will also result in non portable kernel modules in heterogeneous environments.

SUMMARY OF THE INVENTION

The illustrative embodiments provide a computer implemented method, apparatus, and computer program product for using a virtual file system to encrypt files. The process registers a plurality of file systems on a data processing system with the virtual file system. The virtual file system is enabled to encrypt files without intervention from any file system in the plurality of file systems. The virtual file system identifies whether a file on a given file system is an encrypted file using a map file associated with the given file system. In response to identifying the file as an encrypted file, the virtual file system encrypts all data written to the file in accordance with encryption specifications in the map file.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating kernel input/output layers in a data processing system having a virtual file system in accordance with an illustrative embodiment;

FIG. 4 is a block diagram illustrating a dataflow occurring when files are encrypted and/or de-encrypted by a virtual file system in accordance with an illustrative embodiment;

FIG. 5 is a block diagram illustrating a global configuration file in a virtual file system in accordance with an illustrative embodiment;

FIG. 6 is a diagram illustrating a map file in a file system in accordance with an illustrative embodiment;

FIG. 10 is a flowchart illustrating a process for reading from a file in accordance with an illustrative embodiment; and FIG. 11 is a flowchart illustrating a process for encrypting files in accordance with a global configuration file in accordance with an illustrative embodiment.

DETAILED DESCRIPTION OF THE PREFERRED EMBODIMENT

Figure 1:
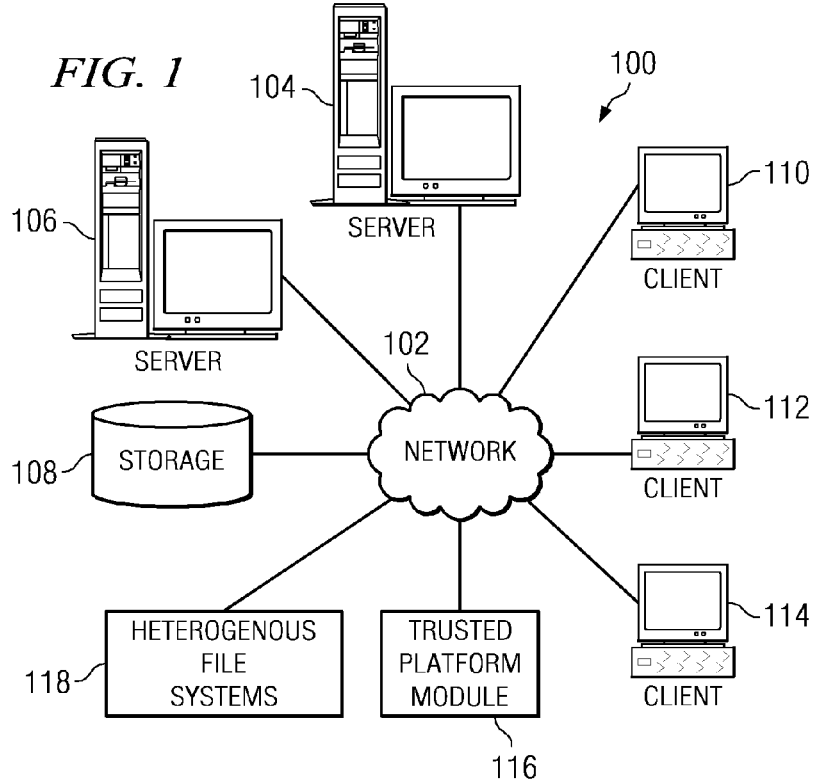
FIG. 1 is a pictorial representation of a network of data processing systems in which illustrative embodiments may be implemented.
Figure 2:
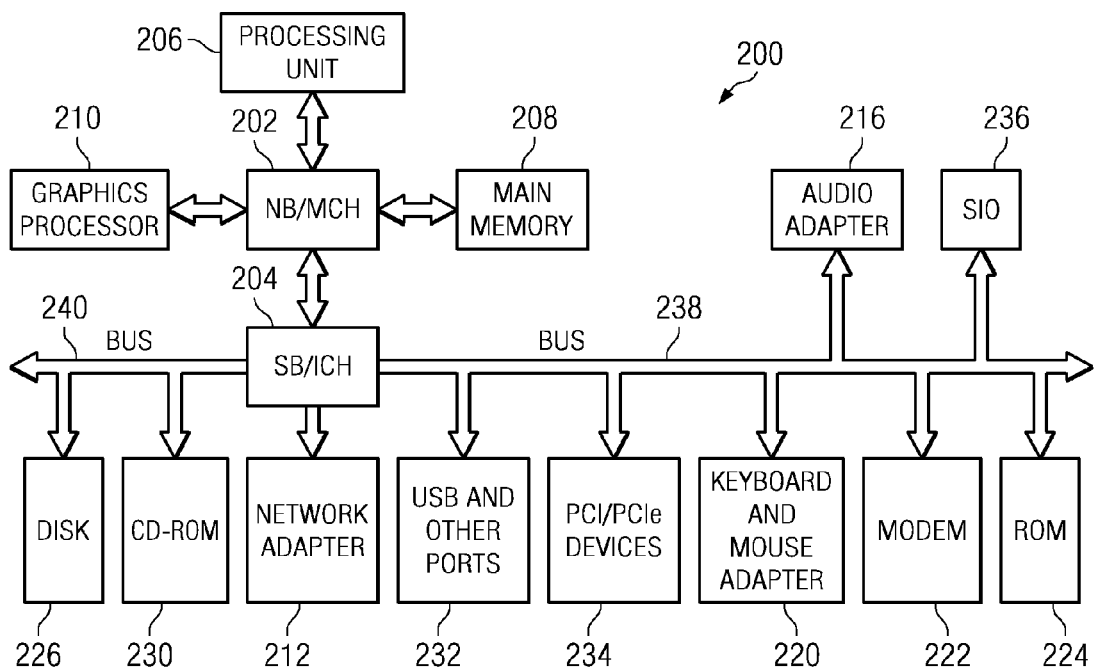
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Trusted platform module (TPM) 116 and heterogeneous file systems 118 are also connected to network 102. Trusted platform module 116 is a microcontroller for secure generation and storage of encryption keys. Trusted platform module 116 is a hardware chip that is unique to a particular device. Therefore, trusted platform module can perform authorization a particular device. Trusted platform module 116 will generally be built into a computer, such as clients 110-114 and/or servers 104 and 106.

Heterogeneous file systems 118 are file systems for storing, managing, and organizing files. Heterogeneous file systems 118 are any known or available types of file systems, including but not limited to, Unix file system (UFS), network file system (NFS), Veritas® file system (VFS), journaling file system (JFS) and (JFS2), extended file system (EXT2), general parallel file system (GPFS), New Technologies file system (NTFS), and file allocation table (FAT). Heterogeneous file systems 118 can be file systems located on data processing system 100, located remotely to data processing system 100, as well as third party file systems located on separate data processing systems that are unassociated with data processing system 100. The file systems can also be part of the servers 104-106 or clients 110-114.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Unix® or any other operating systems that implements a virtual file system for its file system and data organization structure. The programming environment is the same as the operating system code and language, and thus may vary based on the operating system kernel code.

Instructions for the operating system, for the crypto features in the virtual file system or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA or any pervasive computing devices.

A file system is a method or data structure for organizing and managing computer files. There are many different types of file systems currently available, including but not limited to, Unix® file system (UFS), network file system (NFS), Veritas® file system (VFS), journaling file system (JFS) and (JFS2), extended file system (EXT2), general parallel file system (GPFS), new technologies file system (NTFS), and file allocation table (FAT32). A computer system that includes two or more different types of file systems is a heterogeneous file system. Individual file systems generally provide encryption facilities; however, these encryption facilities vary from file system to file system. Therefore, the illustrative embodiments recognize the need to be able to transparently encrypt and de-encrypt files and directories in heterogeneous file systems independently of the various file systems.

A virtual file system (VFS) is an abstraction layer that sits on top of heterogeneous file systems. The virtual file system is a standard and abstract software layer that allows the kernel to call file system functions. The virtual file system allows applications to access files on the various heterogeneous file systems without knowing what type of file system the application is accessing. However, current virtual file systems do not provide encryption facilities.

Therefore, the illustrative embodiments provide a computer implemented method, apparatus, and computer program product for using a virtual file system to encrypt files. The process registers a plurality of file systems on a data processing system with the virtual file system. The virtual file system is enabled to encrypt files without intervention from any file system in the plurality of file systems. The virtual file system identifies whether a file on a given file system is an encrypted file using a map file associated with the given file system. In response to identifying the file as an encrypted file, the virtual file system encrypts all data written to the file in accordance with encryption specifications in the map file.

In response to receiving a request from an authorized user to read data from the encrypted file, the virtual file system de-encrypts all data in the encrypted file in accordance with the encryption specifications after the data is read out of the encrypted file.

As used herein, encryption specifications is data specifying an encryption algorithm and/or a set of encryption keys for the virtual file system to the user when encrypting data written to a file and de-encrypting data read out of a file. As used herein, a set of keys includes one or more keys. A key is a code for encrypting or de-encrypting data. A key can be any type of known or available key for use in encrypting data, such as a private key, a public key, symmetric keys, asymmetric keys, or any other type of encryption keys. In accordance with the illustrative embodiments, any encryption method can be used by the virtual file system to encrypt files and directories at the virtual file system layer.

FIG. 3 is a block diagram illustrating kernel input/output layers in a data processing system having a virtual file system in accordance with an illustrative embodiment. Data processing system 300 is a data processing system associated with heterogeneous file systems. Heterogeneous file systems are file systems of different types. For example, heterogeneous file systems could include a network file system, a Veritas® file system, a journaling file system, and a Unix® file system. In this example, data processing system is a data processing system such as data processing system 100 in FIG. 1 and data processing system 200 in FIG. 2.

When a user or an application requests access to a file on a file system on data processing system 300, the user calls a function to create the file, open the file, write to the file, read from the file, close the file, or any other operation that the user may wish to perform. System call interface layer 302 is the layer at which commands or function calls are entered at a user interface and/or an application programming interface (API). In other words, a function call to read from a file, such as with a read( ) function call, or write to a file, such as with a write( ) function call, occurs at system call interface layer 302. As used herein, a user interface can include, but is not limited to, a command line interface, a menu driven interface, a graphical user interface (GUI), or any combination of these types of interfaces.

Logical file system layer 304 is the layer at which function calls requesting file operations are received by the kernel.

Requests for file operations are made at this level. The requests then move through virtual file system layer 306.

Data processing system 300 includes a virtual file system and a virtual file system at virtual file system layer 306. As each file in a file system on data processing system 300 is created or accessed, the virtual file system acts as an intermediary between the user creating or accessing the file and the file system in which the file is stored.

Virtual file system layer 306 is the layer of the kernel at which the virtual file system is located. The virtual file system allows users and applications to access different types of file systems with disparate implementations in a transparent and uniform way. Thus, a consistent view of multiple disparate file systems with different implementations is made possible at virtual file system layer 306.

In accordance with the illustrative embodiments, virtual file system layer 306 includes encryption layer 307. Encryption layer 307 is a layer of the virtual file system through which file data is encrypted or de-encrypted in accordance with encryption specifications provided in a map file associated with a given file system and/or a global configuration file associated with the virtual file system. As the data in a file is transferred to or from the file system, the virtual file system can encrypt or de-encrypt the data without any intervention from the file system type itself. In other words, the virtual file system encrypts and de-encrypts file data independently of any given file system implementation in which the file is actually stored.

File system implementation layer 308 is the layer of data processing system 300 at which the different file systems are implemented. The file systems in file system implementation layer 308 can include any type of know or available file system.

All file systems are registered with the virtual file system. In addition, all file input and file output occurs through the virtual file system. The virtual file system is aware of the encryption algorithms, configuration data, and encryption keys associated with each encrypted file.

Referring now to FIG. 4, a block diagram illustrating a dataflow occurring when files are encrypted and/or de-encrypted by a virtual file system is shown in accordance with an illustrative embodiment. Virtual file system 400 is a virtual file system for providing an interface or layer between kernel 402 and file system implementations on a data processing system.

Virtual file system 400 provides support for many different file system types simultaneously, such as file systems 404-408. Virtual file system 400 allows for different types of file systems to be mounted together forming a single homogenous view of the file systems. In other words, virtual file system 400 provides a consistent user interface to all file type objects, including but not limited to, regular files, directories, special files, and sockets. Virtual file system 400 also provides support for sharing of files from disparate file system types located remotely to the data processing system on which virtual file system 400 is located. Virtual file system 400 also provides facilities for adding third party file systems to the file systems registered with virtual file system 400. File systems located remotely to virtual file system 400 and third party file systems can be accessed and registered with virtual file system 400 by means of a network connection, such as network 102 in FIG. 1.

Kernel 402 is an operating system kernel for managing resources on a data processing system. For example, kernel 402 is responsible for managing processor resources, input/output devices, and memory.

Kernel 402 registers each file system with virtual file system 400. A registered file system is a file system that is located in file system implementation layer below the virtual file system layer such that the virtual file system is an intermediary between the file systems and applications. In other words, kernel 402 registers a file system by setting up virtual file system 400 as an interface between the file system and kernel 402.

File systems 404-408 are located in a file system implementation layer below the virtual file system layer. File systems 404-408 are any type of known or available concrete file systems, such as heterogeneous file systems 118 in FIG. 1. A concrete file system is an actual implementation of a file system for storing, managing, and organizing files, as opposed to a virtual file system that is only an interface or intermediary between the concrete file system and the operating system kernel.

Virtual file system 400 includes encryption layer 410. Encryption layer 410 is a software component for encrypting and de-encrypting data that is being written to a file or directory in a file system or data that is being read out of a file or directory in a file system located in a file system implementation layer below virtual file system 400. Encryption layer 410 is an encryption layer, such as encryption layer 307 in FIG. 3.

Encryption layer 410 includes global configuration file 412 and key store 414. Global configuration file 412 is a file containing encryption specifications for each file system registered with virtual file system 400, such as file systems 404-408. Global configuration file 412 provides information for configuring the encryption mechanism of virtual file system 400. Global configuration file 412 describes details like encryption algorithm type to use to encrypt or de-encrypt file data, key store, whether all files created in a particular file system are to be encrypted, and whether all the files created on all file systems on the entire data processing system are to be encrypted. Global configuration files 412 are loaded into virtual file system 400 during the data processing system boot or mount operations. Depending on the encryption specifications provided in global configuration file 412, virtual file system 400 encrypts or de-encrypts files that are processed on the data processing system.

Key store 414 is a data storage component for generating and/or storing encryption keys. Key store 414 is any type of hardware or software device for storing keys. For example, key store 414 can include a hardware trusted platform module (TPM) for generating and storing encryption keys. Key store 414 can also include a software component for generating keys based on an algorithm and a data storage device for storing encryption keys. A data storage device is any type of device for storing information, including but not limited to, a database, a hard disk, a read-only memory (ROM), a flash memory, or any other type of data storage device, such as storage unit 108 in FIG. 1.

Each file system includes a map file, such as map files 418-422. A map file is a file associated with a given file system that contains encryption specifications for files and/or directories located on the given file system.

Cache 424 is a kernel level cache associated with virtual file system 400. Map files 418-422 are loaded into cache 424 in order to allow virtual file system 400 to permit virtual file system 400 to speed up the map file look-up process.

A map file is maintained in each file system. Map files 418-422 hold details or specifications regarding a directory or file that is encrypted. Map files 418-422 are normal files in file systems 404-408. However, map files 418-422 can only be accessed by virtual file system 400 because map files 418-422 are encrypted. Virtual file system 400 has the only key to de-encrypt map files 418-422. In other words, the map file itself is encrypted using a master key that is only known to virtual file system 400 to prevent any other entities from reading and misusing the map file data.

When opening a file, virtual file system refers to a map file associated with a file system on which the file is located to identify if the file being opened is an encrypted file. The map file can also contain other details about the file, such as the encryption key used to encrypt the file data, the encryption algorithm used, and any other data regarding details of the file data encryption. The map file allows virtual file system 400 to map encryption routines to the proper encrypted files. In addition, map files allow virtual file system 400 to encrypt individual files with different encryption keys and encryption algorithms without any intervention from the underlying file system.

In this illustrative embodiment, when a user or an application, such as applications 426-430 request an operation be performed on a file located on file system 404, such as a write operation, virtual file system 400 loads map file 418 for file system 404 into cache 424. Virtual file system 400 checks map file 418 to determine if the file is an encrypted file. If map file 418 includes a map file data structure or data object for the file, then the file is an encrypted file. Virtual file system 400 encrypts all data written to the file in accordance with the encryption specifications provided in map file 418 for the file. The encryption specifications include an encryption algorithm and an encryption key for use in encrypting the data. However, if map file 418 does not include a map file data structure or data object for the file, then the file is a non-encrypted file. A non-encrypted file is a file that is not encrypted. Virtual file system 400 does not encrypt or de-encrypt data associated with a non-encrypted file.

In accordance with another example, if file system 404 does not include a map file, virtual file system 400 checks global configuration file 412. If global configuration file 412 indicates that all files in file system 404 are to be encrypted, virtual file system 400 encrypts all data written to the file in accordance with the encryption specifications provided by global configuration file 412.

In this illustrative embodiment, every file system in the file system implementation layer includes a map file. However, in accordance with another embodiment, one or more file systems in the file system implementation layer need not have a map file. In another example, none of the file systems in the file system implementation layer include a map file. In these examples, encryption of a file in a file system that does not include a map file can be determined based on encryption specifications provided in global configuration file 412.

FIG. 5 is a block diagram illustrating a global configuration file in a virtual file system in accordance with an illustrative embodiment. Global configuration file 500 is a template for providing encryption specifications for a file system in a file system implementation layer associated with a virtual file system, such as global configuration file 412 in FIG. 4.

A global configuration file provides a set of encryption specifications for each file system in accordance with global configuration file 500 template. Global configuration file 500 identifies a file system name 502 or other identifier for identifying a given file system. Global configuration file 500 indicates whether all the files in the given file system are to be encrypted or whether all the files in the given file system are not to be encrypted 504. Global configuration file 500 also indicates whether all the files on all the file systems in the file system implementation layer are to be encrypted or not to be encrypted 506. If global configuration file 500 indicates that either a given file system is to be encrypted at 504 and/or all the file systems are to be encrypted at 506, encryption algorithm type 508 indicates a type of encryption algorithm to be used for encrypting all the files on the given file system. For example, encryption algorithm type 508 could include data encryption standard (DES), triple data encryption standard (3DES), or advanced encryption standard (AES) or even public key encryption methods such as RSA (Ron Rivest, Adi Shamir and Len Adleman) algorithm.

Global configuration file 500 containing encryption specifications for each file system registered with the virtual file system are mounted on the virtual file system during system initialization, also referred to as system boot. In another illustrative embodiment, the virtual file system maintains and stores details and information used for encrypting files and directories based on a map file in a configuration file on the virtual file system, such as global configuration file 500.

Turning now to FIG. 6, a diagram illustrating a map file in a virtual file system is depicted in accordance with an illustrative embodiment. Map files 600, 602, and 604 are map files, such as map file 418 in FIG. 4. Each map file is associated with a file or directory in a given file system. In this example, map file 600 is associated with filesystem/tmp 606. Map file 602 is associated with filesystem/home 608. Map file 604 is associated with filesystem/user 610.

A map file is a data structure or data object containing encryption specifications for a given file or a given directory in the file system. A Map file will include structures indicating which encryption algorithm has been used for the file object under consideration. For example, map file 600 for filesystem/tmp will have file structure providing encryption specifications for encrypting data written to files in the /tmp filesystem or de-encrypting data read out of files into /tmp.

Map file 608 for /home filesystem is a map file structure providing encryption specifications for encrypting or de-encrypting data associated with files in the /home filesystem. For example, map file 608 provides encryption specifications for file 1 612, identified as directory/home/vidya, contains information regarding an encrypted key and encryption algorithm for encrypting and de-encrypting data associated with file 1 612. Map file 608 also includes encryption specifications for file 2 614, identified as directory/home/madhu, specifying an encrypted key and encryption algorithm for encrypting and de-encrypting data associated with file 2 614.

Map files for every filesystem is itself encrypted to prevent a malicious user from gaining unauthorized access to information regarding encryption keys and encryption algorithms used to encrypt files. Only virtual file system 616 is able to de-encrypt map files 600-604 encryption. Each map file is updated whenever a new file and/or new directory is created in the filesystem using the open( ) or create( ) system call. Each map file is also updated whenever an existing file or directory is moved to a different location in the filesystem or deleted from the filesystem.

In accordance with an illustrative embodiment, virtual file system 616 loads map files of respective file systems into a kernel level cache associated with virtual file system 616, such as cache 424 of FIG. 4. In this manner, virtual file system 616 is able to gain access to map files, such as map file 600, more quickly during encryption and de-encryption operations.

Figure 7:
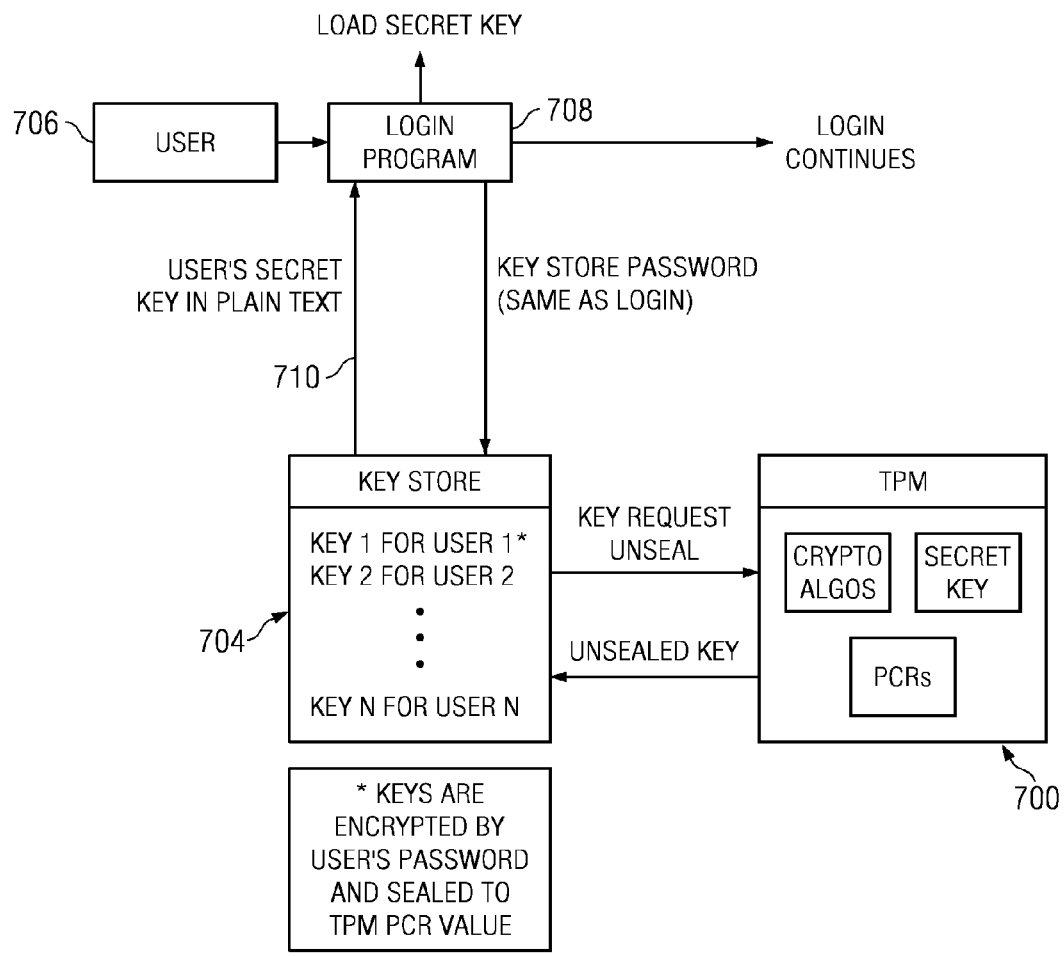
FIG. 7 is a diagram illustrating a trusted platform module implementation for key management in accordance with an illustrative embodiment.

FIG. 7 is a diagram illustrating a trusted platform module implementation for key management in accordance with an illustrative embodiment. Trusted platform module 700 (TPM) can be used as an encryption key generator and encryption key storage. Trusted platform module 700 is a hardware microchip which is coupled with a data processing system. Trusted platform module 700 provides a unique identity to the data processing system, in addition to providing encryption key generation, persistent storage of encryption keys, encryption of data, and digital signatures. Trusted platform module 700 has facilities for encryption key cache management which can be used for storing encryption keys. This ensures that the data encrypted on one system can never be de-encrypted on another system. In this illustrative embodiment, trusted platform module 700 is a trusted platform module specified by Trusted Computing Group.

Key store 704 is a data structure for storing encryption keys. In this illustrative example, a separate key is provided in key store 704 for each user. The key for each user is mapped to the user using a user identifier (UID). The virtual file system can use the key which is meant for that particular user for encryption operations for files owned by the particular user.

Sealing is a feature of trusted platform module 700 that encrypts data so that the data can only be de-encrypted on the same computing device running the same software as when the data was encrypted. When a data processing system is booted up in trusted mode, trusted platform module platform configuration module (PCR) values are used to seal data on the data processing system.

The data can be encrypted with the platform configuration module value as a part of the encryption key. When the data processing system boots in trusted mode and trusted platform module 700 gets the same platform configuration module value, the data can be decrypted.

The private key of a user used for encryption is stored in key store 704 managed by trusted platform module 700. The private key will be sealed to a platform configuration module value and the user's login password. When the user logs into the machine using his password and the PCR register value will unseal the private key.

In this example, user 706 logs on to a data processing system through login program 708 using a password. A password for user 706 is sent to key store 704. Key store contains keys for each user, including user 704. However, the key for user 706 is sealed.

Key store 704 sends a request to unseal the private key to trusted platform module 700. Trusted platform module 700 determines if the password and platform configuration module are correct. If the password for user 706 and platform configuration module values are correct, trusted platform module 700 unseals the key for user 706. Key store 704 sends the key 710 for user 706 to login program 708 in plain text (un-sealed). The secret key for user is then loaded and login continues. Thus, hardware trusted platform module can be used to generate keys and store keys to ensure only authorized users obtain access to protected file systems, directories, and files.

In accordance with the illustrative embodiments, the concrete file systems existing read and write system calls do not need to be changed because the entire encryption operation is carried out in the virtual file systems layer. However, an encryption flag can be added to the flags parameter open system call to indicate the file being created or opened should be encrypted. On finding this encryption flag, the virtual file system will add an entry to the map file for the respective file system of the new file and mark the file as encrypted. The future read and writes on the new file will involve the encryption operations specified in the virtual file system. In one illustrative embodiment, the encryption flag used to indicate that a new file should be an encrypted file is referred to as "O_CRYPT" Flag.

The type of encryption shall be default RSA, DES, 2DES, AES, or any other type of encryption algorithm may be used. The type of encryption to be used is specified in the global configuration file information. In this example, RSA is chosen because it is a public key algorithm. However, the type of encryption for the file can be altered though a file system tool which shall in turn update the map file with the encryption type and key for the file under action. The map file is also updated when files or objects are deleted or moved. In other words, a file open routine and a file delete routine is modified so that the map file is updated in response to opening a new file, moving an existing file, and/or deleting an existing file.

Figure 8:
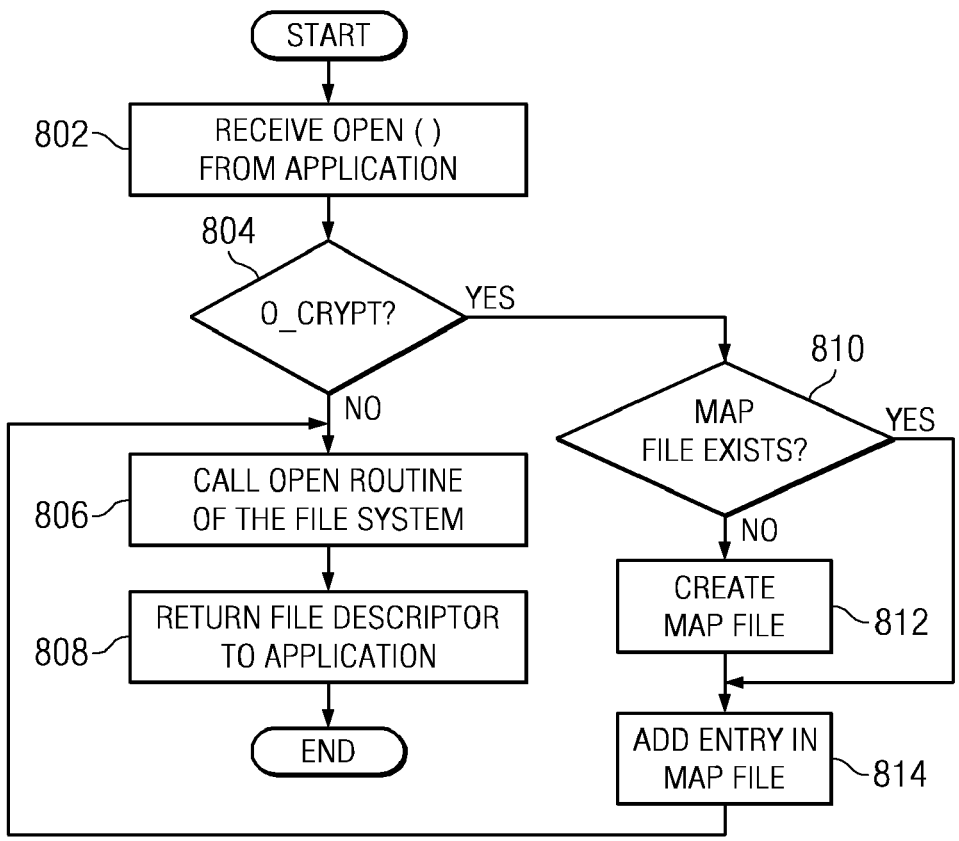
FIG. 8 is a flowchart illustrating a process for creating a new file using an encryption flag in accordance with an illustrative embodiment.

Referring now to FIG. 8, a flowchart illustrating a process for creating a new file using an encryption flag is depicted in accordance with an illustrative embodiment. In this illustrative example shown in FIG. 8, the process is performed by a virtual file system, such as virtual file system 400 in FIG. 4.

The process begins by receiving a function call from an application requesting to open a new file (step 802) at the virtual file system level. The process makes a determination as to whether an encryption flag, such as "O_CRYPT", is present in the function call to open the file (step 804). If the process makes a determination that the encryption flag is not present, the process calls an open routine of the concrete file system (step 806) and returns a file descriptor or file handle to the application (step 808) with the process terminating thereafter. The file descriptor or file handler contains information describing the file for use by read and write functions, such as a pointer to the file.

Returning now to step 804, if the encryption flag is present in the open function call, the process makes a determination as to whether a map file exists for the file system on which the new file will be located (step 810). If a map file does not exist, the process creates a map file entry (step 812). The process then adds a map file entry for the new file to the map file for the respective file system of the new file (step 814). The process calls an open routine of the concrete file system (step 806) and returns a file descriptor or file handle for the new file to the application (step 808) with the process terminating thereafter.

A similar approach can be used when a new directory is being created. An encryption flag can be added to a function call to create a new directory. The virtual file system will encrypt all the files and directories that are created under a given directory in response to identifying the encryption flag in the function call to create the new directory. This approach enables selective encryption of the files and directories in the file system. In other words, some files and directories can be encrypted while other files and directories on the same heterogeneous file systems are non-encrypted files and directories.

Whenever a file is being opened, the virtual file system will look up into the map file of the respective file system to determine if there is an entry for the file in the map file. If an entry is found, then virtual file system encrypts all data that is being written into that file and de-encrypts all the data that is read from that file based on the encryption specification information provided in the map file entry. In other words, the file data is de-encrypted after reading the data from the file system and encrypted before writing the data to the file system. This feature provides complete transparency because both the file system and the user are unaware of the encryption operations being performed by the virtual file system.

Figure 9:
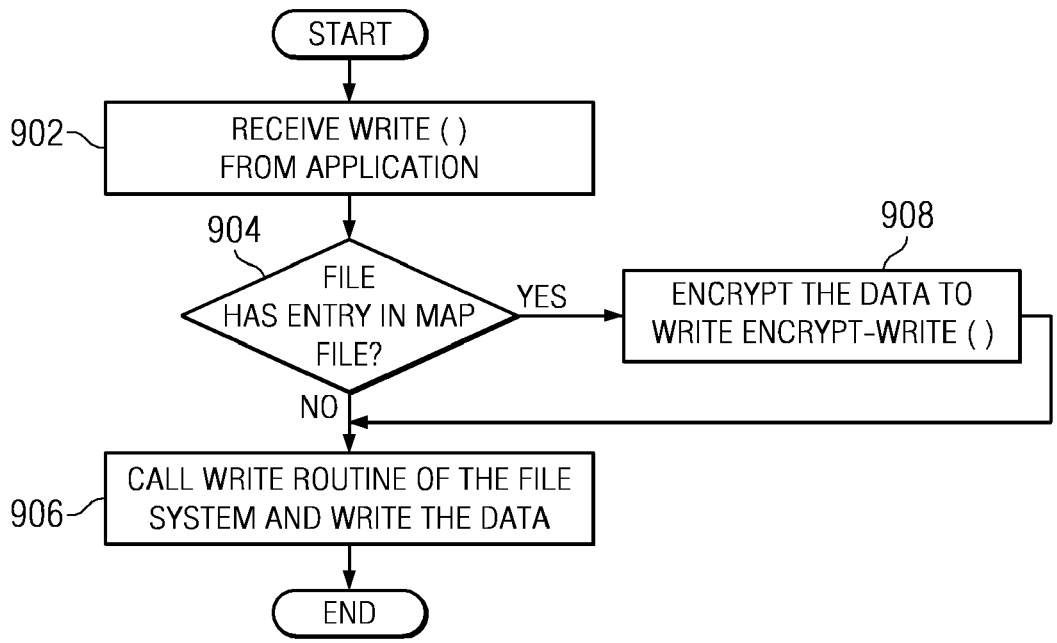
FIG. 9 is a flowchart illustrating a process for writing to a file in accordance with an illustrative embodiment.

FIG. 9 is a flowchart illustrating a process for writing to a file in accordance with an illustrative embodiment. In this illustrative example shown in FIG. 9, the process is performed by a virtual file system, such as virtual file system 400 in FIG. 4.

The process begins by receiving a request to write data to a file (step 902) at the virtual file system level. The process makes a determination as to whether the file has an entry in the map file associated with a file system on which the file is located (step 904). If the file does not have an entry in the map file, the file is a non-encrypted file that is not encrypted. The process calls a write routine of the file system and writes the data to the file (step 906) with the process terminating thereafter.

However, if the file does have an entry in the map file, the file is an encrypted file. The process encrypts the data to be written to the file (step 908) at the virtual file system level before the data is written to the file. The process calls a write routine of the file system and writes the encrypted data to the file (step 906) with the process terminating thereafter.

Turning now to FIG. 10, a flowchart illustrating a process for reading from a file is shown in accordance with an illustrative embodiment. In this illustrative example shown in FIG. 10, the process is performed by a virtual file system, such as virtual file system 400 in FIG. 4.

The process begins by receiving a request to read data from a file (step 1002). The request is received by the virtual file system level. The process calls a read routine of the file system and reads the data from the file (step 1004). The process makes a determination as to whether the file has an entry in the map file associated with a file system on which the file is located (step 1006). If the file does not have an entry in the map file, the file is a non-encrypted file that is not encrypted. The process returns the data read from the file to the requesting application (step 1010) with the process terminating thereafter.

However, if the file does have an entry in the map file, the file is an encrypted file. The process de-encrypts the data read from the file (step 1012) at the virtual file system level. The process returns the de-encrypted data to the requesting application (step 1010) with the process terminating thereafter.

FIG. 11 is a flowchart illustrating a process for encrypting files in accordance with a global configuration file in accordance with an illustrative embodiment. In this illustrative example shown in FIG. 11, the process is performed by a virtual file system, such as virtual file system 400 in FIG. 4.

The process begins by making a determination as to whether a global configuration file specifies that all files in a given file system are to be encrypted (step 1102). If all the files in the given file system are not to be encrypted, the process terminates thereafter. If the global configuration file indicates that all files in a given file system are to be encrypted, the process encrypts all the files in the given file system (step 1104).

The process makes a determination as to whether the global configuration file specifies that all files in all file systems are to be encrypted (step 1106). If all the file systems are not to be encrypted, the process terminates thereafter. In response to a determination that the global configuration file indicates that all files in all file systems are to be encrypted, encrypting all the files in all the files systems (step 1108) with the process terminating thereafter.

The illustrative embodiments provide a computer implemented method, apparatus, and computer program product for using a virtual file system to encrypt files. The process registers a plurality of file systems on a data processing system with the virtual file system. The virtual file system is enabled to encrypt files without intervention of any file system in the plurality of file systems. The virtual file system identifies whether a file on a given file system is an encrypted file based on a map file associated with the given file system. In response to identifying the file as an encrypted file, the virtual file system encrypts all data written to the file in accordance with encryption specifications in the map file.

The process utilizes a global configuration file, map files, and encryption flags to selectively enable encryption of file objects and directory objects in the file system. A user can enable encryption of some objects and disable encryption of other objects by setting an encryption flag, creating an entry in a map file, or setting a configuration file to encrypt all files in a given file system.

Thus, the illustrative embodiments introduce an encryption facility into virtual file systems layer as a generic approach. The process can selectively encrypt individual files, encrypt whole directories, and/or encrypt entire file systems by configuring map files and a global configuration file for the virtual file system. In addition, the virtual file system of the illustrative embodiments is able to selectively encrypt files, directories, and file systems without any intervention by the file systems. In other words, encryption of data by the virtual file system is independent of the concrete file systems implementation, encryption capability, or file system type. Thus, applications can access data, either encrypted or non-encrypted file data, in the same manner.

Moreover, the process overcomes the problem of current implementations that enable a user to access encrypted data from a different mount point, such as a local or remote mount point, because the determination of whether to encrypt or de-encrypt file data is made based on a map file or configuration file. Moreover, the process does not require any encryption layer to be mounted on top of the existing file systems. If a user obtains an encrypted file, the user cannot decrypt the file if the key to the encrypted file is unknown to the user. In other words, if a user without authorization obtains an encrypted file, the user will not be able to access the file data. Only an authorized user with the appropriate key will be able to de-encrypt an encrypted file. In this manner, the process makes user authentication to access encrypted files mandatory. Thus, the virtual file system of the illustrative embodiments makes encryption management across multiple disparate file system types generic and independent of the individual file system implementations.

The illustrative embodiments permit files to be encrypted transparently without the knowledge of existing file systems. This enables encryption support of existing or newly installed file systems without requiring any alteration or modification of the file systems or file system source code. Any type of file system implementations that is registered with the virtual file system can support encryption because the encryption is performed at the virtual file system layer. In addition, individual files can be selectively encrypted or non-encrypted. Any file system with encryption enabled, can include both encrypted files and non-encrypted files.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The illustrative embodiments can also be implemented in whole or in part using hardware, such as power PC and trusted platform module (TPM) for generating encryption keys and storing encryption keys.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for using a virtual file system to encrypt files, the computer implemented method comprising:
    registering a plurality of file systems on a data processing system with the virtual file system, wherein the virtual file system is enabled to encrypt files without intervention from any file system in the plurality of file systems;
    associating an encrypted map file with each of the plurality of file systems registered with the virtual file system;
    de-encrypting, by a processing unit of the virtual file system, the encrypted map file to form a map file, wherein the encrypted map file may only be de-encrypted by the virtual file system;
    responsive to de-encrypting the encrypted map file, identifying whether a file on a given file system is an encrypted file using the map file associated with the given file system, wherein the map file includes an encryption key used to encrypt the file and an encryption algorithm used to encrypt the file;
    responsive to identifying the file as an encrypted file, encrypting, by the virtual file system, all data written to the file in accordance with encryption specifications in the map file; and
    selectively encrypting individual files and directories on the data processing system based on a plurality of map files associated with the plurality of files systems, wherein some files and directories in the plurality of file systems are encrypted, and wherein other files and directories in the plurality of file systems are not encrypted.

2. The computer implemented method of claim 1 further comprising:
    responsive to receiving a request from an authorized user to read data from the encrypted file, de-encrypting, by the virtual file system, all data in the encrypted file in accordance with the encryption specifications after the data is read out of the encrypted file.

3. The computer implemented method of claim 1 further comprising:
    adding an encryption flag to a file open routine, wherein the encryption flag indicates that a file being opened should be encrypted by the virtual file system.

4. The computer implemented method of claim 1 further comprising:
    responsive to a determination that a global configuration file indicates that all files in a file system are to be encrypted, encrypting all files in the file system.

5. The computer implemented method of claim 1 further comprising:
    encrypting files on the plurality of file systems without alteration of existing implementations of the plurality of file systems.

6. The computer implemented method of claim 1 further comprising:
    selectively enabling encryption of objects in a file system in the plurality of file systems, wherein a user can enable encryption of some objects and disable encryption of other objects.

7. The computer implemented method of claim 1 further comprising:
    generating encryption keys by a trusted platform module for encrypting and de-encrypting files.

8. The computer implemented method of claim 1 further comprising:
    storing a user key securely using a trusted platform module;
    retrieving the user key during a login process; and loading the user key into the virtual file system for use in encrypting and de-encrypting files.

9. The computer implemented method of claim 1 further comprising:
    maintaining information for encrypting files and directories based on the map file in a configuration file.

10. The computer implemented method of claim 9 wherein maintaining information for encrypting files further comprises:
    modifying a file open routine wherein the map file is updated responsive to opening a new file.

11. The computer implemented method of claim 9 wherein maintaining information for encrypting files further comprises:
    modifying a file delete routine, wherein the map file is updated responsive to deleting an existing file.

12. A computer program product comprising:
    a computer readable storage device including computer usable program code for using a virtual file system to encrypt files, said computer program product comprising:
    computer usable program code for registering a plurality of file systems on a data processing system with the virtual file system, wherein the virtual file system is enabled to encrypt files without intervention from any file system in the plurality of file systems;
    computer usable program code for associating an encrypted map file each of the plurality of file systems registered with the virtual file system;
    computer usable program code for de-encrypting the encrypted map file to form a map file, wherein the encrypted map file may only be de-encrypted by the virtual file system;
    computer usable program code for identifying whether a file on a given file system is an encrypted file using the map file associated with the given file system in response to de-encrypting the encrypted map file, wherein the map file includes an encryption key used to encrypt the file and an encryption algorithm used to encrypt the file;
    computer usable program code for encrypting, by the virtual file system, all data written to the file in accordance with encryption specifications in the map file in response to identifying the file as an encrypted file; and
        computer usable program code for selectively encrypting individual files and directories on the data processing system based on a plurality of map files associated with the plurality of files systems, wherein some files and directories in the plurality of file systems are encrypted, and wherein other files and directories in the plurality of file systems are not encrypted.

13. The computer program product of claim 12 further comprising:
    computer usable program code for de-encrypting, by the virtual file system, all data in the file in accordance with the encryption specifications after the data is read out of the encrypted file, in response to receiving a request from an authorized user to read data from the encrypted file.

14. The computer program product of claim 12 further comprising:
    computer usable program code for adding an encryption flag to a file open routine, wherein the encryption flag indicates that a file being opened should be encrypted.

15. The computer program product of claim 12 further comprising:
    computer usable program code for encrypting files on the plurality of file systems without alteration of existing implementations of the plurality of file systems.

16. The computer program product of claim 12 further comprising:
    computer usable program code for selectively enabling encryption of objects in a file system in the plurality of file systems, wherein a user can enable encryption of some objects and disable encryption of other objects.

17. An apparatus comprising:
    a bus system;
    a communications system connected to the bus system;
    a memory connected to the bus system, wherein the memory includes computer usable program code; and
    a processing unit connected to the bus system, wherein the processing unit executes the computer usable program code to register a plurality of file systems on a data processing system with the virtual file system, wherein the virtual file system is enabled to encrypt files without intervention from any file system in the plurality of file systems;
    associate an encrypted map file with each of the plurality of file systems registered with the virtual file system;
    de-encrypt the encrypted map file to form a map file, wherein the encrypted map file may only be de-encrypted by the virtual file system;
    identify whether a file on a given file system is an encrypted file using the map file associated with the given file system in response to de-encrypting the encrypted map file, wherein the map file includes an encryption key used to encrypt the file and an encryption algorithm used to encrypt the file;
    encrypt, by the virtual file system, all data written to the file in accordance with encryption specifications in the map file in response to identifying the file as an encrypted file; and
    selectively encrypt individual files and directories on the data processing system based on a plurality of map files associated with the plurality of files systems, wherein some files and directories in the plurality of file systems are encrypted, and wherein other files and directories in the plurality of file systems are not encrypted.

18. The apparatus of claim 17 wherein the processor unit further executes the computer usable program code to de-encrypt, by the virtual file system, all data in the encrypted file in accordance with the encryption specifications after the data is read out of the file in response to receiving a request from an authorized user to read data from the encrypted file.

19. The apparatus of claim 17 wherein the processor unit further executes the computer usable program code to add an encryption flag to an open system call, wherein the encryption flag indicates that a file being opened should be encrypted.

* * * * *